United States Patent
Blackburn et al.

(10) Patent No.: US 6,312,043 B1
(45) Date of Patent: Nov. 6, 2001

(54) FLUSH-MOUNTED FRAMELESS VEHICLE WINDOW

(75) Inventors: Raymond Blackburn, Sainte-Claire; Rejean Beauregard, Honfleur; Serge Carrier, Sainte-Jean-Chrysostome, all of (CA)

(73) Assignee: Prevost Car, Inc. (CA)

( * ) Notice: Subject to any disclaimer, the term of this patent is extended or adjusted under 35 U.S.C. 154(b) by 0 days.

(21) Appl. No.: 09/085,483

(22) Filed: May 27, 1998

(30) Foreign Application Priority Data

Jan. 23, 1998 (CA) ................................................. 2224981

(51) Int. Cl.[7] ....................................................... B60J 1/14
(52) U.S. Cl. ....................... 296/146.16; 296/178; 49/394; 49/399; 49/400; 49/DIG. 1
(58) Field of Search .......................... 296/146.15, 146.16, 296/201, 178; 49/394, 141, 399, 400, DIG. 1

(56) References Cited

U.S. PATENT DOCUMENTS

| | | | |
|---|---|---|---|
| 2,509,362 | * | 5/1950 | Miller ........................................ 49/141 |
| 2,787,348 | * | 4/1957 | Goodemote et al. .................... 49/141 |
| 3,534,501 | | 10/1970 | Carlsson et al. . |
| 3,794,373 | * | 2/1974 | Manning ............................... 296/178 |
| 3,913,265 | * | 10/1975 | Ehret et al. ............................ 49/394 |
| 4,638,598 | | 1/1987 | Gold . |

FOREIGN PATENT DOCUMENTS

| | | | |
|---|---|---|---|
| 1057796 | | 7/1979 | (CA) . |
| 3428506 | * | 2/1986 | (DE) ................................ 296/146.15 |
| 1544 | * | 4/1979 | (EP) ................................ 296/146.15 |
| 2667109 | * | 3/1992 | (FR) ................................ 296/146.16 |
| 203482 | * | 8/1988 | (JP) ........................................ 296/178 |

\* cited by examiner

*Primary Examiner*—Dennis H. Pedder
(74) *Attorney, Agent, or Firm*—Pendorf & Cutliff

(57) ABSTRACT

A window construction for vehicles such as motor coaches is disclosed which includes a window panel that overlaps on the exterior of the vehicle body at least one of the edge portions defining the window opening. In particular, the window includes a window panel which is mounted to the vehicle body and on the exterior thereof at least partly covers the edges of the vehicle body which define the window opening, especially the window jams. Mounting the window panel flush with an exterior surface of the vehicle body facilitates insulation and sealing of the window and allows placement of draft seals between the exterior surface of the vehicle body and the panel so that they do not protrude into the window opening. The hardware used to fasten the window panel to the vehicle body is affixed to the panel in a marginal portion which extends beyond the window opening so that the hardware does not protrude substantially into the window opening and into the field of view. The window panel includes a central portion for substantially covering the window opening and a marginal portion integral with and extending outwardly from the central portion for covering at least one of the edge portions defining the window opening, preferably at least one of the window jams. When the vehicle includes two or more adjacent windows separated by a post, generally the respective window jams, the marginal portions of the window panels for the adjacent openings cooperatively cover an outside surface of the post. With this construction, the panels provide a smooth substantially continuous outer surface uninterrupted by window jams or posts. This not only provides an aesthetically pleasing appearance from the outside of the vehicle, but also facilitates cleaning of the vehicle and reduces wind noise.

16 Claims, 5 Drawing Sheets

FLUSH-MOUNTED FRAMELESS VEHICLE WINDOW

FIELD OF THE INVENTION

The invention relates to vehicle windows and, especially to windows for motor coaches and the like.

BACKGROUND OF THE INVENTION

Conventional vehicle windows which may be fixed or openable generally consists of a window panel mounted to the vehicle to fit in and close an aperture or window opening in the vehicle body. The opening is defined by portions of the vehicle body which may be structural members or body portions connected therewith. The panel normally consists of a transparent or semi-transparent sheet of glass or plastic which is held in and mounted to the vehicle by way of a frame.

Window constructions of this type require the use of a large number of parts and the exact fitting of the panel to the outline of the opening. This increases manufacturing costs for windows having a curved or asymmetric shape. Furthermore, the use of a frame increases the weight of the window which is undesirable for situations where the window is intended to be swung out to function as an escape door and as such must be held open during an emergency. Moreover, the appearance of vehicles having a series of framed windows adjacent to one another is not particularly aesthetically appealing, since adjacent windows are respectively separated by an intermediate window post or jamb which is clearly visible and protrudes from the common plane of the windows.

Canadian Patent No. 1,057,796 by Niesser discloses a window sash construction for motor coaches wherein a glazing sheet is fitted into the window opening and is mounted to the vehicle wall by hinges and latches that are bolted to the glazing sheet and spaced inwardly from edges of the sheet. In other words, the hinges and latches are clearly visible from within the vehicle, interfere with visibility and reduce the field of view for each window. The seals for the window are mounted to the edges of the opening and also intrude into the window opening which further reduces the field of vision. Moreover, the window panel is reset in the vehicle wall which is not aesthetically appealing and increases problems with cleaning of the vehicle and wind noise.

U.S. Pat. No. 4,638,598 by Gold describes a window construction for a vehicle including a window pane which is fitted into the window opening and recessed from an outer surface of the vehicle body. The hinge and latch members are affixed to the window pane within the visual field. This construction does also not overcome the above-described drawbacks of reduced visual field, wind noise and cleaning problems.

U.S. Pat. No. 3,534,501 by Carlsson et al., teaches a frame molding for a vehicle window. The window includes inner and outer sheets which abut each other along their edges and are clamped together along an edge by the molding in a way allowing the window panels to change dimensions and slide relative to each other in the molding. The issue of fitting the window into the window opening and the sealing of the window to the vehicle are not addressed.

SUMMARY OF THE INVENTION

It is now an object of the invention to provide a window construction overcoming the above-described drawbacks of prior art constructions.

It is a further object to provide a window construction with a window panel overlapping on the exterior of the vehicle body, at least one of the vehicle body edge portions defining the window opening.

It is another object of the invention to provide a window having a window panel which is mounted to the vehicle body and on the exterior thereof at least partly covers the edges of the vehicle body which define the window opening, especially the window jambs. Mounting the panel to an exterior surface of the vehicle body facilitates installation and sealing of the window and allows placement of draft seals between the exterior surface of the vehicle body and the panel so that they do not protrude into the window opening.

It is a further object to provide a closure system for a vehicle having at least two adjacent window openings separated by a vehicle body member generally adjacent jamb of the openings, including a closure panel for each opening wherein adjacent panels cooperatively cover an outside surface of the vehicle body member. With this construction, the panels provide a smooth substantially continuous outer surface uninterrupted by window jambs or posts. This not only provides an aesthetically pleasing appearance from the outside of the vehicle, but also facilitates cleaning of the vehicle. Furthermore, the airflow along the vehicle in the window area is substantially less turbulent which reduces wind noise, contrary to conventional window constructions wherein the window jambs of the vehicle body protrude above the outer surface of the window panels, thereby protruding into the airflow and causing turbulence.

Accordingly, the invention provides a closure for a vehicle with a vehicle body having an interior, an exterior and an exterior surface and a window opening defined by vehicle body edge portions forming the header, jamb and sill portions of the opening. The closure includes a panel for closing the opening and means for mounting the panel flush with the exterior surface of the vehicle body, the panel having a first portion for substantially covering the window opening and a marginal portion integral with and extending outwardly from the first portion for covering at least one of the jamb portions.

In another aspect of the invention, there is provided a closure system for a vehicle with a vehicle body having an interior, an exterior and an exterior surface and a pair of adjacent window openings defined by vehicle body edge portions forming the header, jambs and sill portions of the openings and being separated by an intermediate vehicle body element. The closure system includes a closure in accordance with the invention for each window opening, wherein the marginal portions of the panels of the respective adjacent closures are shaped and constructed for cooperatively and substantially completely covering an exterior surface of the intermediate body member.

Preferably at least one of the closures of the vehicle is mounted to the vehicle body for movement between an open position permitting use of the window as an escape hatch and a closed position wherein the panel completely closes the opening.

The marginal portion preferably extends completely about the first portion and overlaps at least part of the vehicle body edge portions defining the window opening. The panel is preferably made of a transparent sheet, an opaque sheet, a semi-transparent sheet, or a tinted transparent sheet. Most preferably, the panel is made of tempered glass, laminated glass or clear plastic.

In a preferred embodiment, the invention provides a closure wherein the first portion of the panel includes spaced apart parallel inner and outer glazing sheets which are maintained in the spaced apart condition by a spacer extending around the first portion and which are sealed to each other at the spacer to form a thermopane unit. In that embodiment, the marginal portion is an integral part of the outer glazing sheet and edges of the inner glazing sheet are inwardly spaced from the vehicle body portions defining the window opening.

BRIEF DESCRIPTION OF THE DRAWINGS

A preferred embodiment of a closure in accordance with the invention will now be described in detail by way of example only and with reference to the attached drawings, wherein.

DETAILED DESCRIPTION OF THE PREFERRED EMBODIMENT

A preferred embodiment of the closure in accordance with the invention will be described in the following in detail as being installed in a motor coach only. However, it will be readily apparent to a person skilled in the art that the closure of the invention can be used with any vehicle having a window opening in the vehicle body and, consequently, that the present invention is not limited to windows for motor coaches, but extends to vehicle windows in general.

Figure 1:
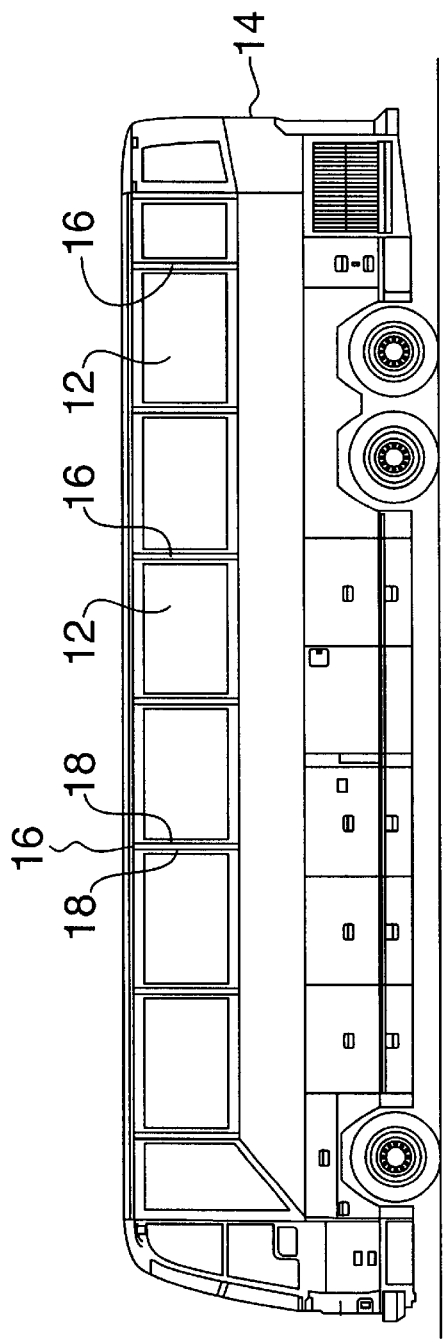
FIG. 1 shows a prior art window arrangement of a motor coach.
Figure 2:
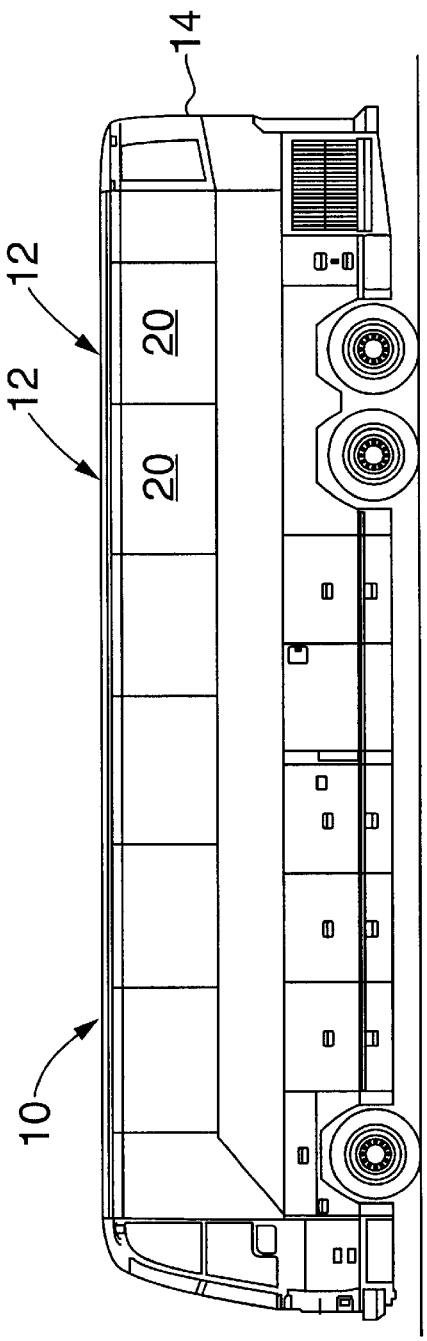
FIG. 2 is a side elevational view of a motor coach including a series of closures in accordance with the invention.

Referring first to FIGS. 1 and 2, passenger transport vehicles such as motor coaches, generally have a series of windows 12 in each sidewall of the vehicle body 14. In prior art window constructions for motor coaches, one of which is illustrated in FIG. 1, the windows are separated by intermediate structural members 16, generally referred to as posts, which form part of the vehicle body and include the jambs of the adjacent windows and are apparent from the exterior of the vehicle and protrude outwardly beyond the surface of the adjacent window panels 18. This is not particularly aesthetically appealing and interferes with the cleaning of the vehicle's exterior surface. Furthermore, the posts 18 protrude into the airflow around the vehicle which increases turbulence and, thus, wind noise.

These problems are overcome with the flush-mounted closure in accordance with the invention as is apparent from FIG. 2 which illustrates a motor coach 10 with a series of preferred closures 20 in accordance with the invention. The closures 20 are mounted flush with an exterior surface of the vehicle rather than inside the window opening and adjacent closures 20 cover the exterior of the posts (not visible) between the windows 12.

Figure 3:
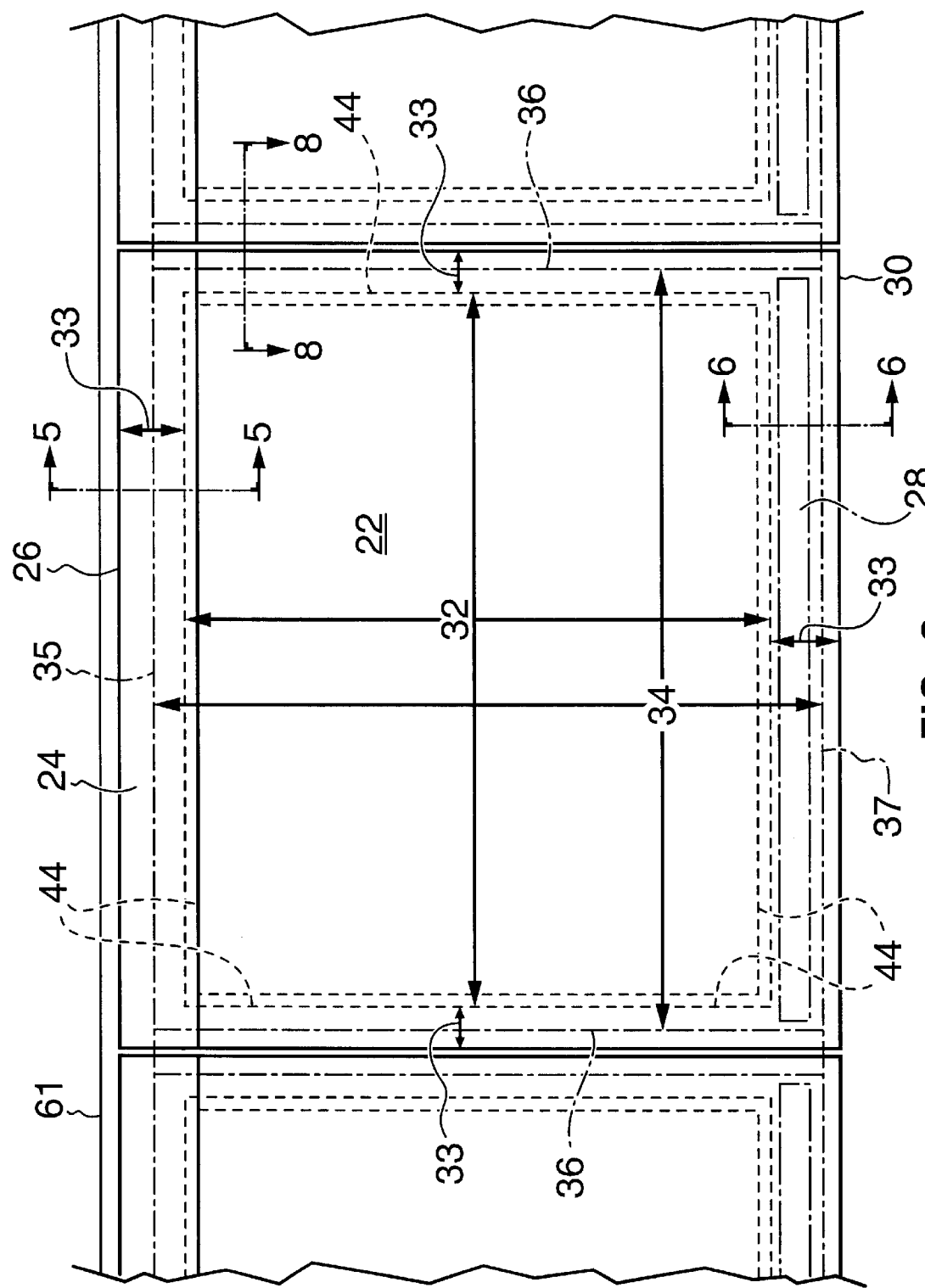
FIG. 3 is a plan view of a preferred embodiment of the closure in accordance with the invention.
Figure 4:
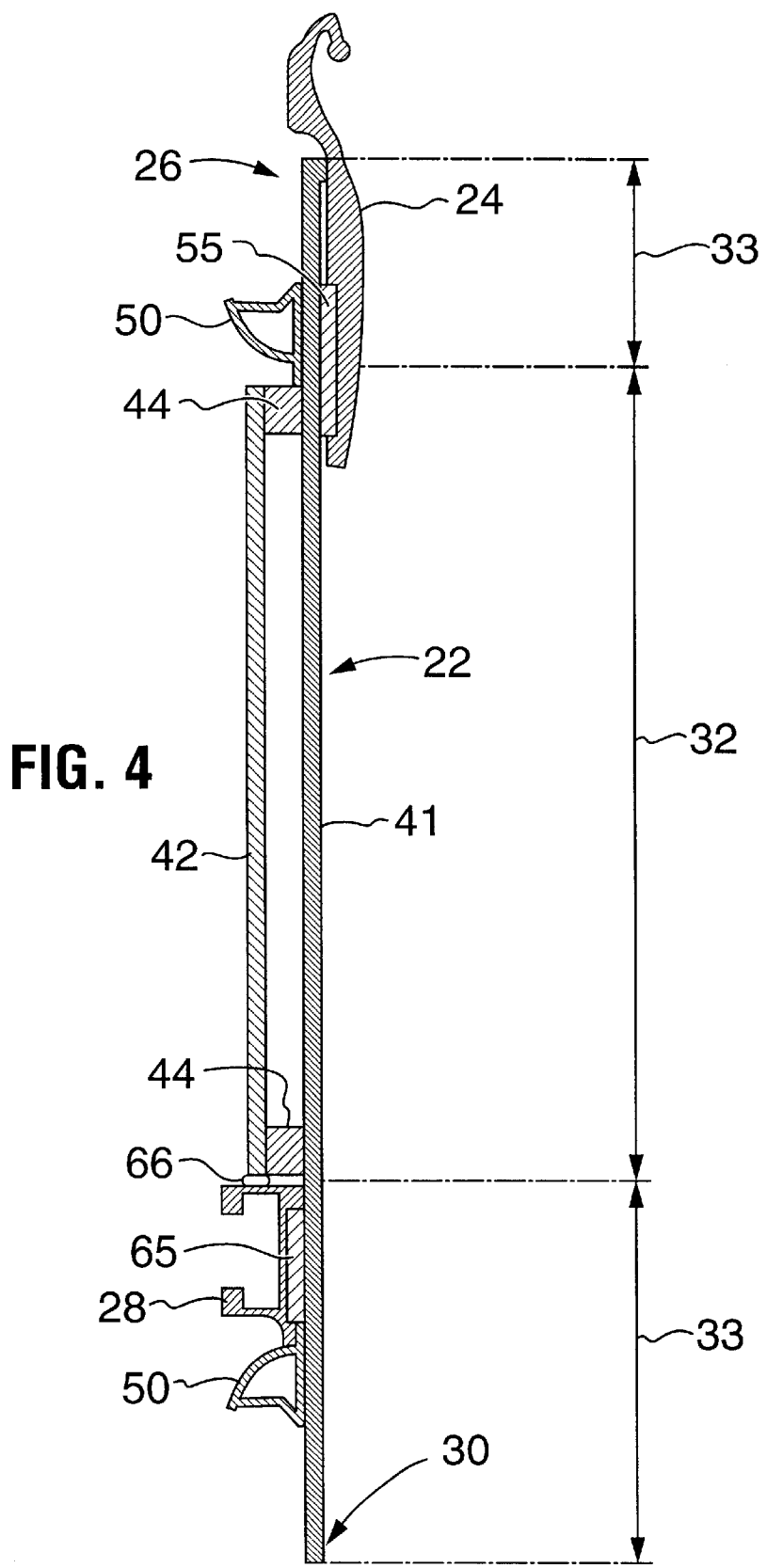
FIG. 4 is a vertical cross section through the preferred embodiment shown in FIG. 3.

The preferred closure 20 in accordance with the invention as illustrated in FIGS. 3 and 4 includes a panel 22, in this embodiment a glazing unit, a hinge extrusion 24 mounted to a top edge 26 of the panel 22 and a latch mount 28 affixed to the panel adjacent a bottom edge 30 thereof. The panel 22 has a first or central portion 32 which essentially corresponds in size and shape to the window opening 34 and a marginal portion 33 extending outwardly from the central portion. The opening 34 is defined by vehicle body portions which form the header 35, jambs 36, and sill 37 of the window opening. The marginal portion 33 of the panel 22 overlaps at least one jamb 36 of the opening 34, but in this preferred embodiment, extends completely around the central portion 32 and covers the header 35, jambs 36, and seal 37 of the opening 32. With this construction, the panels 22 form a substantially continuous, smooth window surface which is easy to clean and substantially reduces wind resistance and turbulence.

The panel 22 is a sheet of sealed thermopane glazing, including an outer glazing sheet 41 extending the full length and width of the panel 22 and an offset inner glazing sheet 42 which extends substantially over the central portion 32 only. The inner glazing sheet 42 is maintained in a spaced apart parallel configuration to the outer glazing sheet 41 by a spacer 44. The space between the glazing sheets 41, 42 is partially evacuated and sealed by way of a sealing material applied around the spacer 44 in the conventional manner well-known in the art of thermopane glazing sheets. By sizing the inner glazing sheet 42 to fit the window opening 34, the outer glazing sheet 41 of the panel 22 can be mounted closely adjacent the exterior surface of the vehicle body 11 to provide an improved aesthetic appearance and a smooth outer window surface and to facilitate sealing of the closure to the vehicle body 14. To minimize encroachment of the hinge extrusion 24 into the field of view, the hinge extrusion is attached to the marginal portion 33 of the panel 22 and along the top edge 26 of the panel. For the same reason, the latch mount 28 is positioned in a marginal portion 33 along the bottom edge 30 of the panel 22 and behind the latch catch 46 (see FIG. 6) which is bolted to the sill 37 by bolts 31 and defines the bottom edge of the field of view from the interior of the coach. A pair of conventional latch mechanism 48 known in the art of motor coaches (only one shown) are connected to the latch mount 28 in a conventional manner, in this embodiment by bolts 29. Any seals provided between the panel 22 and the vehicle body are also mounted in a manner not to encroach on the field of vision.

As is apparent from FIGS. 4, 5, 6, 7 and 8, draft seals 50 are adhesively affixed to the inner surface of the outer glazing sheet 41 and in the marginal portion 33 adjacent the spacer 44. Furthermore, a jamb seal 52 is adhesively affixed to the post 18 and in a manner to be located centrally between the draft seals 50 when the window is closed so that the seal engages the vertical edges of the outer glazing sheets 41 and substantially closes the gap therebetween. A second set of draft seals (not illustrated) is preferably adhesively affixed to the exterior surface of the vehicle body outside the window opening and in a manner to be located adjacent the draft seals 50 in the closed condition of the panel 22 to engage the marginal portion 33 of the panel 22 in the closed condition, which improves the overall sealing characteristics and reduces wind noise.

Figure 6:
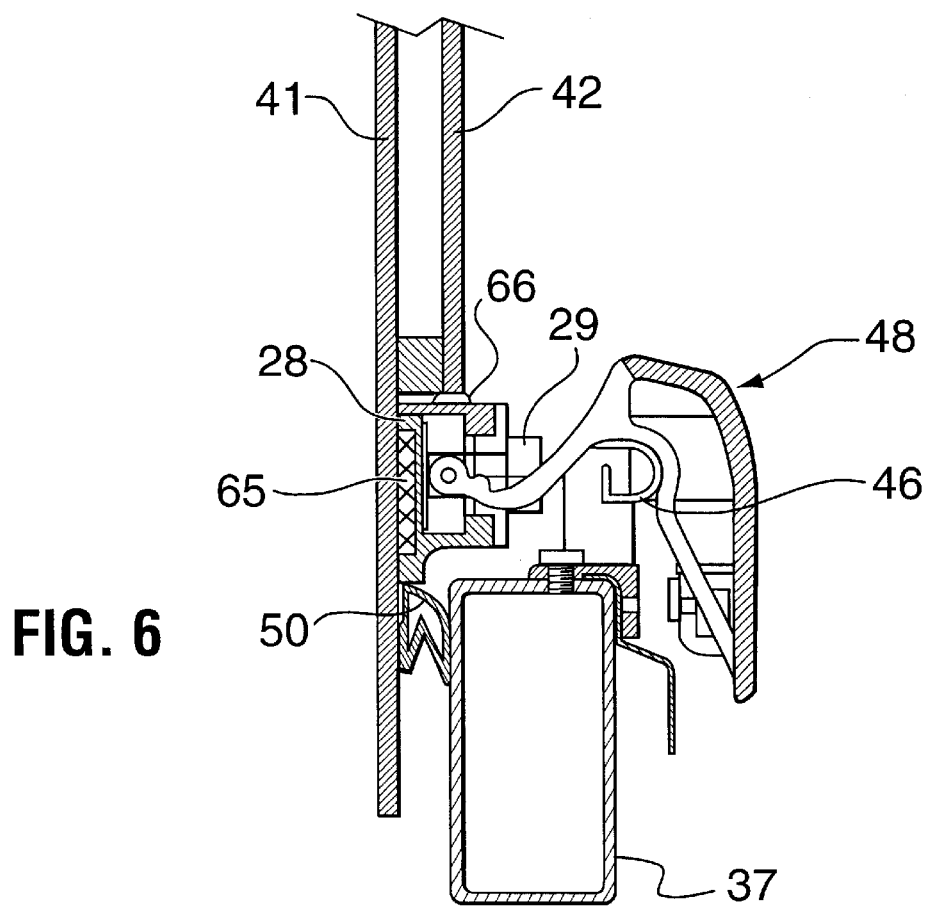
FIG. 6 is a cross section through the latch region of the preferred embodiment shown in FIG. 3 and taken along line 6—6.
Figure 7:
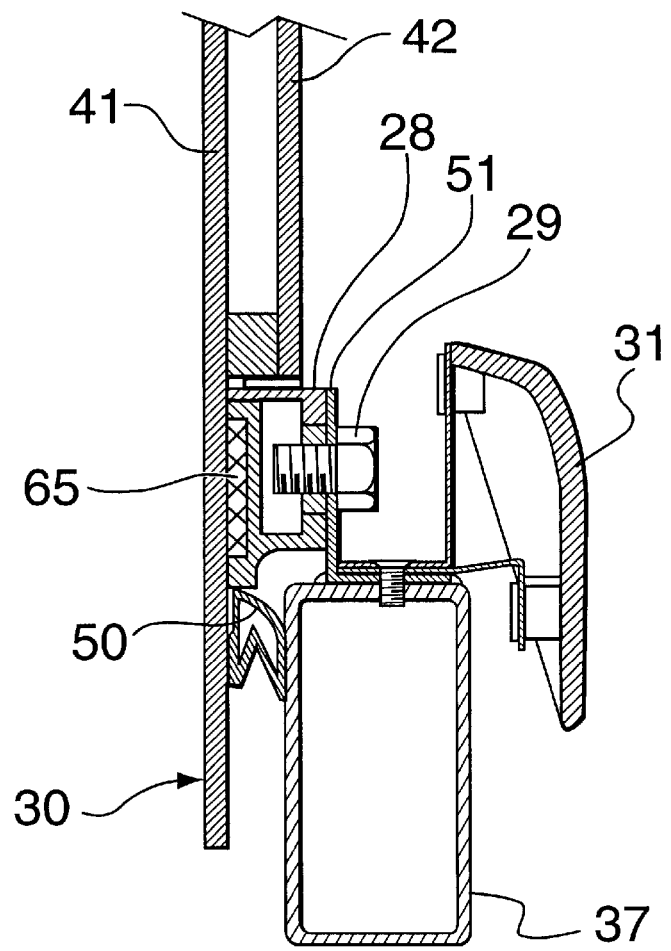
FIG. 7 is cross section through the latch region of a variant of the preferred embodiment shown in FIG. 3 and taken along the same plane as FIG. 6, wherein the panel is fixed and cannot be opened.
Figure 8:
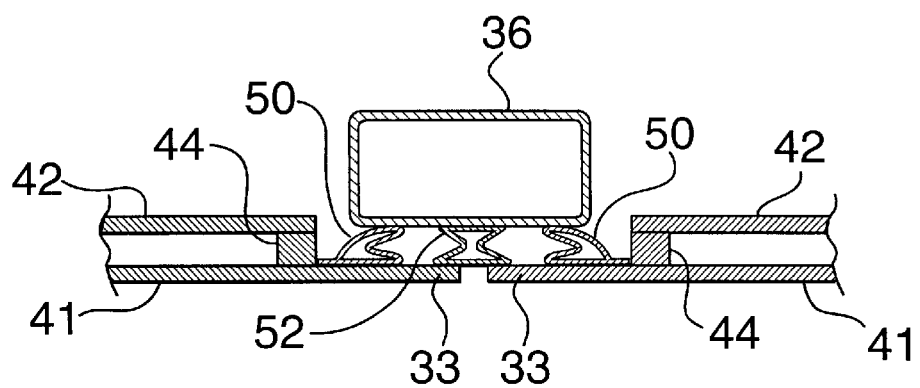
FIG. 8 is a cross section through a jamb region of the preferred embodiment shown in FIG. 3 and taken along line 8—8.

FIG. 7 illustrates a variant of the preferred closure construction shown in FIG. 6, wherein the closure is held permanently closed. This is achieved by permanently fixing the bottom edge 30 of the panel 22 to the sill 37 by an angled section 51. The angled section 51 is fastened to the latch mount 28 by bolts 29 and is welded to the sill 37. A cover 31 is provided along the window sill 37 and in front of the latch mount 28 to hide this attachment structure from view.

Conversion of a fixed closure to an openable closure is easily achieved by removing the bolts 29 and connecting the latch mount to the sill 37 as described above through latch catch 46 and latch mechanism 48. The latch catch 46 is mounted to the sill laterally offset from the angled section 51 which in the embodiment where the window can be opened functions as a stop for the latch mount 28. This ensures that the bottom end of the panel 22 is firmly held in place by the latch mechanism 48 and the angled section 51 thereby preventing rattle. Thus, the fixed window closure illustrated in FIG. 7 can be easily converted to an openable window closure by simply releasing the latch mount from the angled extrusion 51 and connecting it to the sill through latch mechanism 48.

Figure 5:
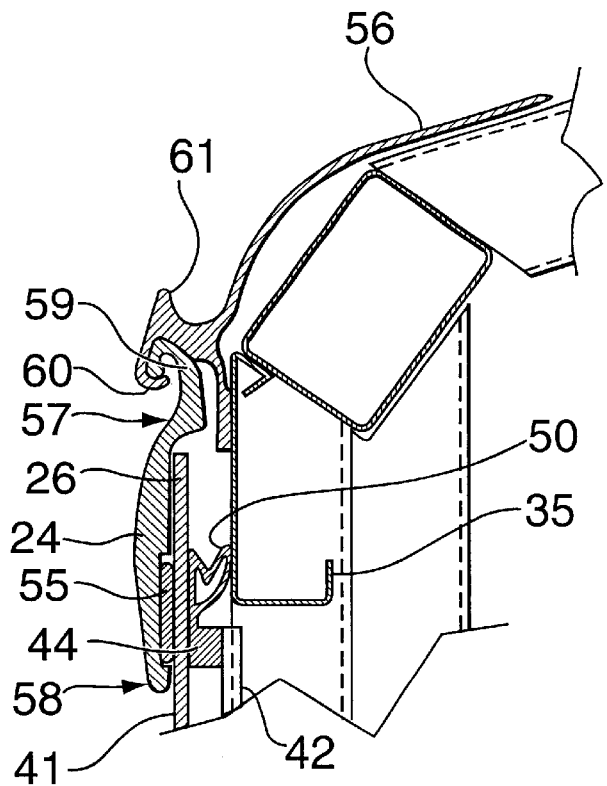
FIG. 5 is a cross section through the hinge region of the preferred embodiment shown in FIG. 3 and taken along line 5—5.

Turning now to FIG. 5, the hinge extrusion 24 is attached to top edge 26 by way of an adhesive strip 55 extending over the whole length of the hinge extrusion (see also FIG. 4). The extrusion has first and second opposite longitudinal edges 57, 58. The first edge 57 includes a hook-shaped hinge section 59 which pivotally engages a complementary hooked-shaped extension 60 of the roof extrusion 56 which also includes the eaves trough portion 61 in this embodiment. The width of the hinge extrusion 24 is selected so that at least a portion of the adhesive strip 55 is positioned over the spacer 44. With this construction, it is achieved that the panel 22 in accordance with the invention will not disintegrate and will continue to function as a closure for the window opening 34 even if the outer glazing sheet 41 is broken. The continuous structure which will remain in this situation consists of the hinge extrusion 24, the marginal portion 33 of the outer glazing sheet 41 attached thereto, the spacer 44, and the inner glazing sheet 42. A similar effect is achieved at the bottom edge 30 of the panel 22 by positioning the latch mount 28 adjacent the spacer 44 and attaching it to the spacer by a bead of adhesive 66 and connecting the latch mount 28 to the marginal portion 33 of the outer glazing sheet 41 at the bottom edge 30 thereof. In case the outer glazing sheet 41 is broken, the inner glazing sheet 42 will remain connected to the latch mechanism 48 and; thus, the sill 37 through the spacer 44, the connection thereof with the marginal portion 33 of glazing sheet 41, which remains intact due to its attachment to the latch mount 28, and the adhesive connection of the spacer 44 to the latch mount 28 through the adhesive 66. On the other hand, if the inner glazing sheet 42 is broken, the closure remains intact as well, since the hinge extrusion 24 and the latch mount 28 are both connected to the outer glazing sheet 41. This construction provides an exceptional safety feature, since the closure panel of the closure in accordance with the invention will remain intact and continue to function as a closure for the respectively associated window opening even if one of the glazing sheets of the thermopane is broken.

Although the closure of the invention in the preferred embodiment has a panel with a marginal portion that extends completely about the central portion, it is readily apparent that the marginal portion can extend only about one or both lateral vertical edges of the panel as long as the post or jamb portions of the window opening are covered.

The panel is preferably a sheet of thermopane glazing as described. However, other types of panels such as transparent, opaque, semi-transparent and tinted transparent sheets of tempered glass, laminated glass or plastic can be used equally well.

Changes and modifications in the specifically described embodiments can be carried out without departing from the scope of the invention which is intended to be limited only by the scope of the appended claims.

What is claimed is:

1. A window panel for a vehicle with a vehicle body having an interior, an exterior, and an exterior surface and a window opening defined by vehicle body edge portions forming header, jamb, and sill portions of the opening, the window panel comprising:

inner and outer glazing sheets maintained in a spaced-apart parallel configuration by a spacer placed along an outside edge of the inner glazing sheet, the inner glazing sheet being of substantially the same size and shape as the window opening for fitting into the window opening, and the outside glazing sheet being larger than the window opening and having at least one marginal portion extending outwardly beyond the spacer along an edge of the outside sheet so that the marginal portion of the outside sheet overlaps at least one of the vehicle body edge portions defining the window opening;

means for pivotally mounting the panel to the vehicle body for movement between an open position permitting use of the window opening as an escape hatch and a closed position wherein the panel completely closes the opening, whereby the inner and outer glazing sheets and the spacer together form a sealed window unit; and wherein the means for pivotally mounting is attached to the marginal portion of the outer glazing sheet so that a major portion of the means for pivotally mounting is outside the window opening with a portion thereof positioned over the spacer, and generally not visible from the interior of the vehicle.

2. The window panel as defined in claim 1, wherein the marginal portion of the outer glazing sheet extends substantially about the inner glazing sheet and overlaps at least part of the vehicle body edge portions defining the window opening.

3. The window panel as defined in claim 1, wherein the inner and outer glazing sheets are selected from the group consisting of fully transparent sheets, opaque sheets, semi-transparent sheets, and tinted transparent sheets.

4. The window panel as defined in claim 1, wherein the inner and outer glazing sheets are made of a material selected from the group consisting of tempered glass, laminated glass, and clear plastic.

5. The window panel as defined in claim 4, wherein a flexible seal is mounted to the outer glazing sheet in the marginal portion for engaging an outside surface of the vehicle body portions defining the window opening and sealing against the vehicle body so that the seal does not protrude into the window opening.

6. The window panel as defined in claim 1, further comprising a latch means for retaining the window panel in the closed position.

7. The window panel as defined in claim 6, wherein the latch means includes a latch mount affixed to the marginal portion of the outer glazing sheet adjacent the spacer with the latch mount attached to the spacer, and a retaining mechanism mounted to one of the vehicle body edge members defining the window opening.

8. The window panel as defined in claim 7, wherein the retaining mechanism is mounted to a sill portion of the window opening and is selected from the group consisting of a first mechanism permanently engaging the latch mount and a second mechanism releasably engaging the latch mount.

9. The window panel as defined in claim 8, wherein the latch mount, the sill portion, and the retaining mechanism are shaped and constructed to permit conversion of the window panel between a fixed window panel and an openable window panel by interchanging of the first and second mechanisms.

10. A vehicle window panel for a vehicle with a vehicle body having an interior, an exterior and an exterior surface and a window opening defined by vehicle body edge portions forming header, jamb, and sill portions of the opening, the window panel comprising;

a transparent glazing panel for closing the opening;

means for pivotally mounting the panel to the vehicle body for movement between an open position permitting use of the window opening as an escape hatch and a closed position wherein the panel closes the opening;

the transparent glazing panel being a sealed window unit having first and second spaced-apart transparent glazing sheets, and the first sheet being larger than the second sheet and having a marginal portion for overlapping an exterior surface of at least one of the vehicle body edge portions, and the means for pivotally mounting being mounted to the marginal portion of the first transparent glazing sheet; and the first and second transparent glazing sheets are spaced apart by a spacer placed along a margin of the second transparent glazing sheet, and the means for pivotally mounting includes a fastening plate for attachment to the marginal portion of the first transparent glazing sheet having first and second opposite longitudinal edges, and a first hinge portion for pivotal engagement of a second hinge portion mounted on the vehicle body, the first hinge portion extending along the first longitudinal edge of the fastening plate, the width of the fastening plate being selected so that at least a portion of the lower, second longitudinal edge is attached to and extends over the marginal portion of the first transparent glazing sheet in the region above the spacer so that the second transparent glazing sheet will remain attached to the marginal portion through the spacer even when the first transparent glazing sheet is broken at the central portion of the panel.

11. The window panel as defined in claim 10, wherein the transparent glazing sheets are selected from the group consisting of fully transparent sheets, opaque sheets, semi-transparent sheets, and tinted transparent sheets.

12. The window panel as defined in claim 10, wherein the first and second transparent glazing sheets are made of a material selected from the group consisting of tempered glass, laminated glass, and clear plastic.

13. The window panel as defined in claim 10, further comprising a latch means for retaining the window panel in the closed position.

14. The window panel as defined in claim 13, wherein the latch means includes a latch mount affixed to the marginal portion of the first transparent glazing sheet adjacent the spacer with the latch mount attached to the spacer, and a retaining mechanism mounted to one of the vehicle body edge members defining the window opening.

15. The window panel as defined in claim 14, wherein the retaining mechanism is mounted to a sill portion of the window opening and is selected from the group consisting of a first mechanism permanently engaging the latch mount and a second mechanism releasably engaging the latch mount.

16. The window panel as defined in claim 15, wherein the latch mount, the sill portion, and the retaining mechanism are shaped and constructed to permit conversion of the window panel between a fixed window panel and an openable window panel by interchanging of the first and second mechanisms.

\* \* \* \* \*